United States Patent [19]
Boyle et al.

[11] 3,831,590
[45] Aug. 27, 1974

[54] APPARATUS FOR MEASURING THE AREA BETWEEN A FLUCTUATING SIGNAL AND AN INCLINED BASELINE

[75] Inventors: Kenneth Hector McKinnon Boyle, Glasgow; Thomas Rogers, Milngavie, both of England

[73] Assignee: Barr and Stroud Limited, Glasgow, England

[22] Filed: May 3, 1972

[21] Appl. No.: 250,038

[30] Foreign Application Priority Data
June 30, 1971 Great Britain .................... 30573/71

[52] U.S. Cl. .......................................... 128/2.05 R
[51] Int. Cl. ............................................. A61b 5/02
[58] Field of Search..... 128/2.05 A, 2.05 F, 2.05 M, 128/2.05 Q, 2.05 R, 2.05 T, 2.05 V, 2.06 A, 2.06 R, 2.1 R; 235/183, 191

[56] References Cited
UNITED STATES PATENTS
| | | | |
|---|---|---|---|
| 3,051,165 | 8/1962 | Kompelien | 128/2.05 A |
| 3,486,499 | 12/1969 | Yen | 128/2.05 Q |
| 3,549,874 | 12/1970 | Vachitis | 235/183 |
| 3,552,381 | 1/1971 | Burns et al. | 128/2.05 A |
| 3,652,842 | 3/1972 | Lenin | 235/183 |
| 3,678,922 | 7/1972 | Phillips et al. | 128/2.05 F |

*Primary Examiner*—William E. Kamm
*Attorney, Agent, or Firm*—Mason, Fenwick & Lawrence

[57] ABSTRACT

Apparatus for measuring the area between a flucuating signal and an inclined baseline, as for example in measuring cardiac stroke volume and output, wherein the area between the signal and the baseline is measured between two limits. The apparatus comprises an integrator for measuring the area between a curve and a datum baseline coincident with one of the limits of the inclined baseline and extending between the limits, means for measuring the length of the datum baseline, means for measuring at the second limit the distance normal to the datum baseline from the latter to the inclined baseline, means for multiplying the length and the distance measured and halving the product to obtain the area between the baselines, and means for summating the areas.

6 Claims, 38 Drawing Figures

Vpd = Voltage associated with the Previous Diastole

APPARATUS FOR MEASURING THE AREA BETWEEN A FLUCTUATING SIGNAL AND AN INCLINED BASELINE

This invention relates to cardiac monitoring apparatus for measuring the area between a fluctuating signal and an inclined baseline, and in particular to apparatus for measuring cardiac stroke volume and output, the latter being the summation of stroke volume over a specified time period, and for providing other associated information.

With the recent advances in open heart surgery and treatment of heart disease it has become increasingly desirable to measure cardiac output and stroke volume accurately and to have such information and other associated information available continuously. In particular such measurement of cardiac output is essential for testing the functioning of synthetic parts inserted in the heart, testing heart pacemakers (Registered Trade Mark), testing the effects of drugs on the functioning of the heart, and for general diagnosis of heart diseases.

Various methods and apparatus for providing the necessary information are in use at present all of which suffer from the disadvantage of either being unsuitable for continuous use on a patient, or inaccurate.

An object of the present invention is to provide improved apparatus for measuring the area between a fluctuating signal and an inclined baseline and capable of measuring cardiac output and stroke volume.

According to the present invention there is provided apparatus for measuring the area between a fluctuating signal and an inclined baseline and between two limits, comprising an integrator for measuring the area between a curve and a datum baseline coincident with one of the limits of the inclined baseline and extending between said limits, means for measuring the length of said datum baseline, means for measuring, at said second limit, the distance, normal to said datum baseline, from the datum baseline to the inclined baseline, means for multiplying said length and said altitude and halving the product to obtain the area between said baselines and means for summating said areas.

An embodiment of the present invention will now be described by way of example, with reference to the accompanying drawings, in which.

Figure 33:
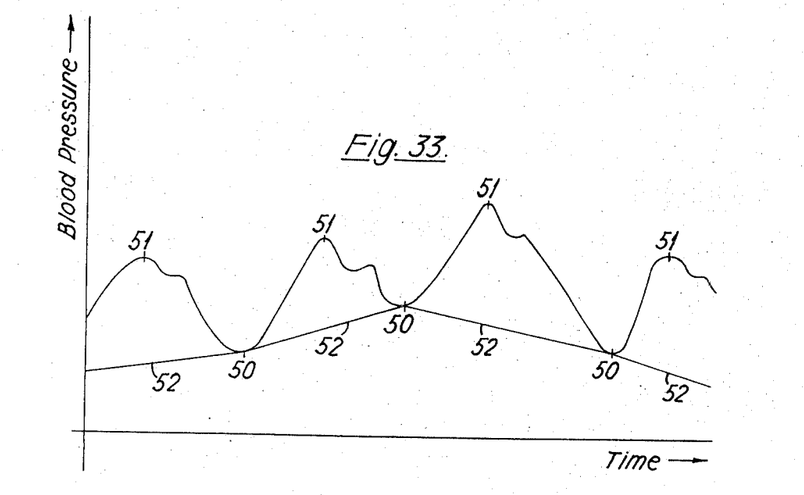
FIG. 33 is a graph of a patient's blood pressure plotted against time.
Figure 34:
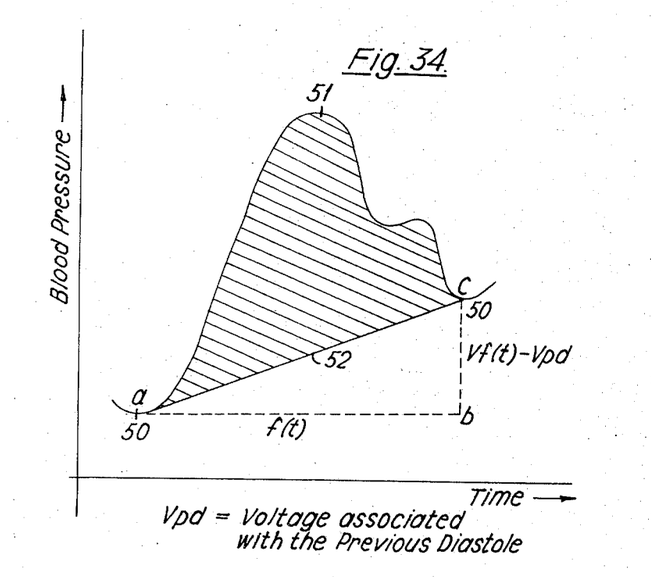
FIG. 34 is a graph corresponding to FIG. 32 and showing a single waveform.

FIG. 33 shows a graph of a patient's blood pressure against time, the diastoles being indicated at 50 and the systoles at 51. It is desired to measure the area between the curve and the inclined baseline formed by the line 32 joining adjacent diastoles, this area is shown shaded in FIG. 34. As can be seen from FIG. 33 the inclination and length of the line 52 changes for each waveform due to modulation of the signal by the patient's breathing. Each waveform is formed by the curve passing from a diastole 50 through a systole 51 to an adjacent diastole 50.

Figure 29:
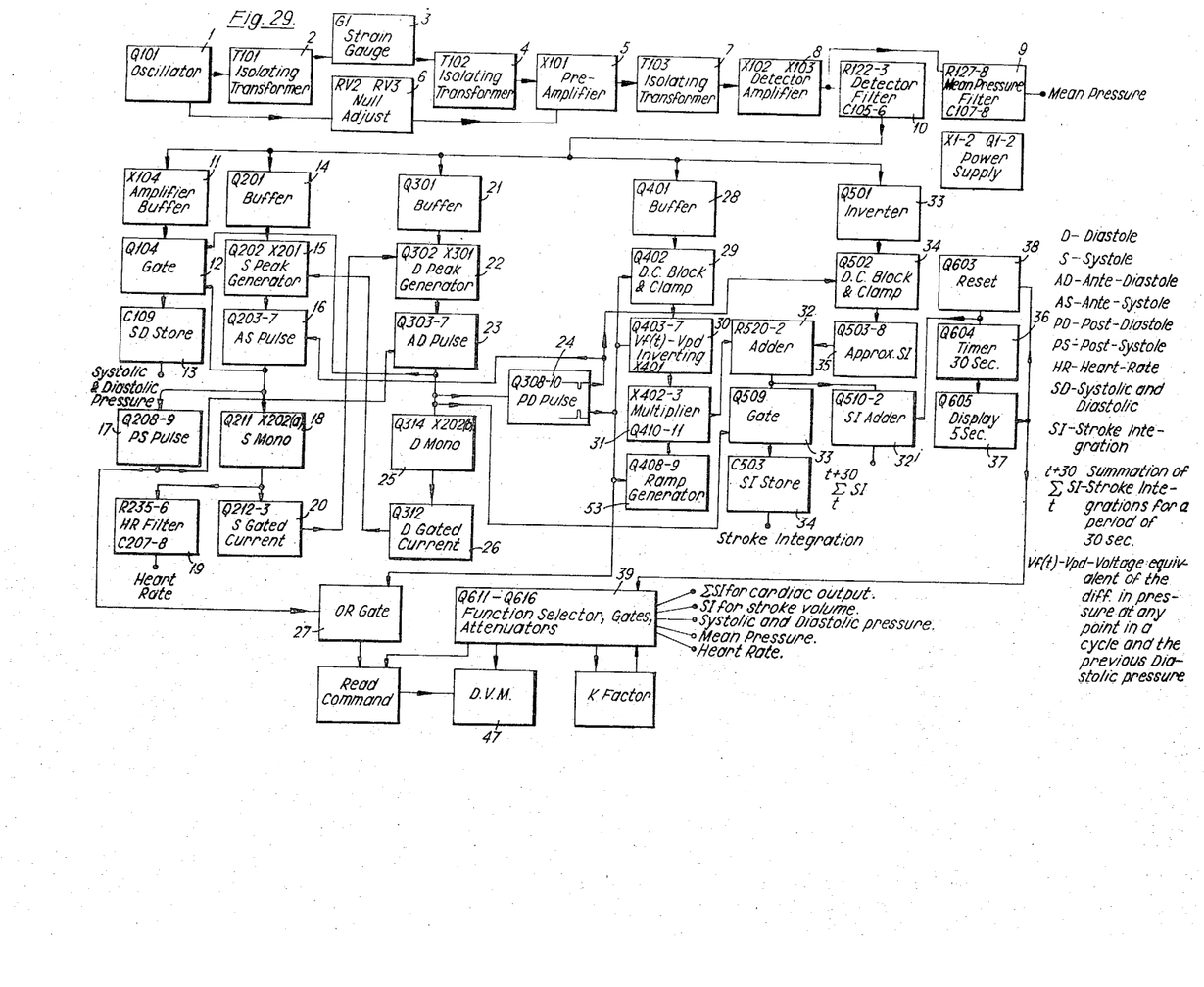
FIG. 29 is a block diagram represeenting the circuitry of apparatus according to the invention.

Referring now to FIG. 29 of the drawings, an oscillator 1 produces a carrier signal of constant amplitude, one branch of the carrier signal is fed through an isolating transformer 2 to a strain gauge bridge 3 where the carrier signal amplitude is modulated in accordance with variations in a patient's blood pressure. The modulated signal then passes through a further isolating transformer 4 to be amplified in a pre-amplifier 5. A null adjust device 6 is fed with a second branch of the carrier signal emanating from the oscillator and the output from the null adjust device passes to the pre-amplifier 5 where it can be combined with the first branch of the carrier signal for the purposes of zeroing the instrument.

The amplified modulated signal passes from the preamplifier 5 through a further isolating transformer 7 to a detector amplifier 8 where full wave rectification of the signal takes place. An output from the detector amplifier 8 passes to a low-pass filter 9 the output from which is related directly to the patient's mean blood pressure.

The output from the detector amplifier also passes to a wide band low-pass detector filter 10 the output from which is a smoothed signal related directly to the patient's fluctuating blood pressure. The output from the detector filter 10 is then fed into five branches as can be seen in FIG. 29.

In the first branch, the smoothed signal is passed through an amplified buffer 11 to a gate 12 which passes the systolic and diastolic values of the signal. Ante-systole and ante-diastole pulses open the gate sequentially, the generation of these pulses will be described later. When the gate is closed the last signal voltage applied is passed to a store 13 and can be read as voltages related to the patient's systolic and diastolic blood pressure.

In the second branch, the smoothed signal passes through a buffer 14 to a systole peak-generator 15 which detects the systolic pressure, inverts the signal and amplifies the detected systole. Detection of the systole is ensured (except under very abnormal conditions) by an A.C. coupling and a clamp included in the generator. In order to ensure detection during transient changes, the waveform on which the clamp operates is drawn positive for approximately 100 mS by a diastole gated-current, the generation of which will be described later, which comprises a signal generated in the interval between adjacent systolic points on the signal and for a time lasting from just before, until just after, the pertinent diastolic points. The output from the generator 15 passes to an ante-systole pulse generator 16 which generates a pulse starting before the systole and ending on the systolic peak as detected by the generator 15. The pulse thus generated is the ante-systole pulse which is fed to the gate 12 and to a post-systole pulse generator 17, the latter generating a pulse which starts on the trailing edge of the ante-systole pulse and ends at a predetermined time after the systole. The output from the post-systole pulse generator has two branches as will be described later.

The signal generated by the ante-systole pulse generator 16 also passes to a systole-mono generator 18, where a third pulse is generated starting from the leading edge of the ante-systole pulse and ending, after a predetermined time interval, in general, after the systole. The systole-mono pulse thus generated is passed firstly to a filter 19, the smoothed outpt from which provides a reading related to the heart rate of the patient, and secondly to a systole gated-current generator 20 the output from which forms the systole gated-current.

In the third branch, the smoothed signal is passed through a buffer 21 to a diastole peak-generator 22 which inverts the signal and detects and amplifies the diastole in the same manner as the systole peak-generator 15. Detection is again ensured (except under very abnormal conditions) by an A.C. coupling and a clamp. In order to detect the diastole during transient changes the waveform on which the clamp operates is drawn negative for approximately 100 mS by the systole gated-current produced by the generator 20, the output from the latter being fed to the diastole peak-generator 22. The signal from the generator 22 passes to an ante-diastole pulse generator 23 corresponding to the ante-systole pulse generator 16. The ante-diastole pulse produced is passed firstly to the gate 12, secondly to a post-diastole pulse generator 24 and thirdly to a diastole-mono generator 25 in the same manner as the output from the ante-systole pulse generator 16. The output from the diastole-mono generator passes to the diastole gated-current generator 26 the output from which is fed to the systole peak-generator 15.

The post-diastole pulse generator 24 has two outputs of opposite polarity. The negative pulse is fed to the ante-systole pulse generator 16 and the post-systole pulse produced by the post-systole pulse generator 17 is fed to the ante-diastole pulse generator 23 along one of the branches of the output thereof. The positive output from the post-diastole pulse generator has four branches, one of which passes the positive pulse to an OR gate 27 which also receives as an input the post-systole pulse along the second branch of the output from the post-systole pulse generator 17.

In the fourth branch, the smoothed signal passes through a buffer 28 to a D.C. block and clamp 29 which also receives as an input the positive pulse along one of the branches from the output of the post diastole pulse generator 24. The post-diastole pulse acts to clamp each wave form of the signal to earth at the diastoles. Just before clamping the voltage of the diastole with respect to the previous diastole is measured by a detector 30 which receives as inputs the output from the D.C. block and clamp and the positive post-diastole pulse. The difference in pressure between a diastole and the preceding diastole is measured and applied in the form of a voltage to a multiplier 31 which also has as an input a signal generated by a ramp generator 53. The latter receives as an input the positive post-diastole pulse and generates a ramp between adjacent pulses. The product from the multiplier 31 is passed to an adder 32, the function of which will be described later.

In the fifth branch the smoothed signal is passed through a signal inverter 33 to a further D.C. block and clamp 34 which also receives, as an input, the negative post-diastole pulse from the post-diastole pulse generator 24. The D.C. block and clamp 34 operates in similar manner to the D.C. block and clamp 29 using an inverted signal. The signal with all D.C. components removed and with each diastole clamped to earth is then passed to an integrator 35 which integrates each wave form of the signal using, as a baseline, the level of the immediately preceding diastole which has been clamped to earth by the D.C. block and clamp 34. The output from the integrator 35, which forms the approximate stroke integration, is passed to the adder 32 and the sum of the approximate stroke integration and the product from the multiplier 31 is calculated and passed, firstly, to a gate 33 which is opened and closed by the ante-diastole pulse generated by the ante-diastole pulse generator 23. The output from the gate passes to a stroke integration store 34 from which a reading may be taken which is related to the stroke integration. The output from the adder is secondly passed to a stroke integration adder 32' which is connected to a timer 36 and which calculates the sum of the stroke integrations over a period of 30 seconds or other predetermined time.

The timer includes a 30 second integration timer 36, a 5 second display timer 37, the function of which will be described later, and a short reset pulse generator 38 for the sum of the stroke integrations.

A function selector 39 is connected to the filters 9 and 19, the systole and diastole store 13, the stroke integration store 34 and the stroke integration adder 35, these will hereinafter be referred to collectively as "functions."

Figures 30, 30A:
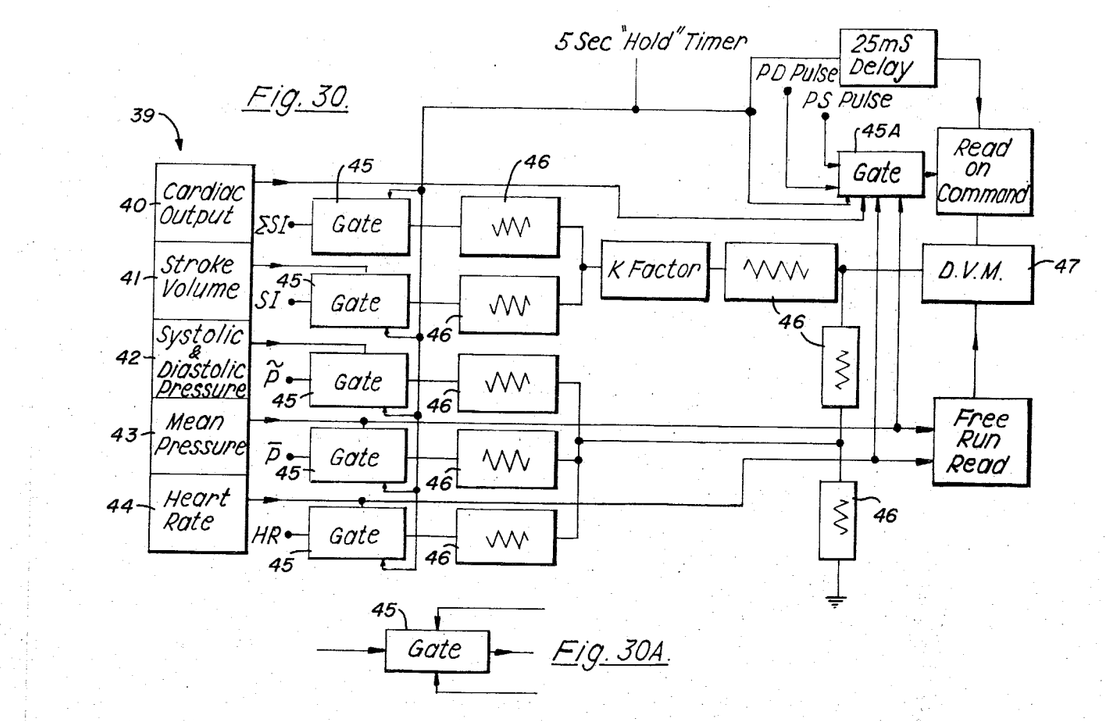
FIGS. 30 and 30A are block diagrams representing details of the circuitry of FIG. 29.

Referring to FIG. 30, it can be seen that the function selector includes selector switches 40 to 44 corresponding to each function and a gate 45 for each function. Each gate 45, see FIG. 30A, is connected to receive an input from a function and to pass same, on command, through resistors 46 to a digital voltmeter 47 so that an operator may obtain the desired information.

The sum of the stroke integrations and the stroke integration functions after passing through the appropriate gate are attenuated by a "K" factor, so that the reading obtained at the digital voltmeter is that of the patient's cardiac output and stroke volume, respectively. The 'K factor' is a constant for each patient and is obtained by simultaneously measuring the cardiac stroke volume by the apparatus according to the present invention and by a known and accurate non-continuous method (such as by indicator dilation) and is the quotient of the two results. The gates 45 associated with each of the functions, except the sum of the stroke integrations, are opened by a command from the pertinent selector switch 41 to 44 and closed by a command from the display timer 37. Thus, when the function is selected the pertinent information is displayed by the digital voltmeter for thirty seconds and is then automatically cancelled for five seconds while the cardiac output is displayed. The sum of the stroke integration is, by virtue of the timer 36, only available every 30 seconds and this information is displayed every 30 seconds irrespective of whether or not any other function has been selected. The display lasts for 5 seconds and is cancelled by the gate 45A.

FIG. 33 shows a graph of a patient's blood pressure against time, the diastoles being indicated at 50 and the systoles at 51. It is desired to measure the area between the curve and the inclined baseline formed by the line 52 joining adjacent diastoles, this area is shown shaded in FIG. 34. As can be seen from FIG. 33 the inclination and length of the line 52 changes for each wave form due to modulation of the signal by the patient's breathing. Each wave form is formed by the curve passing from a diastole 50 through a systole 51 to an adjacent diastole 50.

Figure 1:
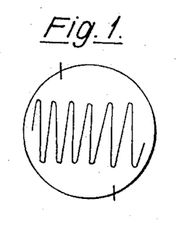
FIGS. 1 to 28 are schematic representations of the form of signals generated or existing at specific points in the circuitry of apparatus for measuring cardiac output and stroke volume according to the invention.
Figure 2:
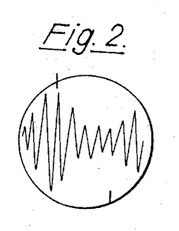
Figure 3:
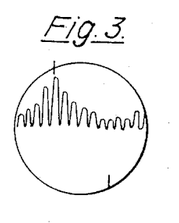
Figure 4:
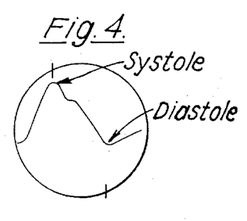
Figure 5:
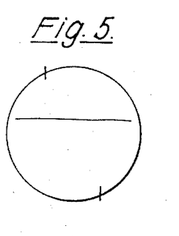

In operation the oscillator 1 produces a carrier signal (FIG. 1) which is amplified, then modulated (FIG. 2) by the strain gauge 3 in accordance with variations in the patient's blood pressure. The signal is then rectified (FIG. 3) by the detector amplifier 8 and smoothed (FIG. 4) by the detector filter 10. Before smoothing the signal is also passed to the mean pressure filter 9 which smoothes the signal (FIG. 5) using longer time constants so as to obtain a reading of the patient's mean blood pressure.

Figure 6:
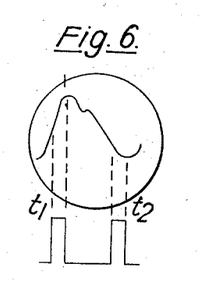
Figure 7:
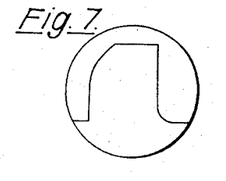

The smoothed signal is split into five branches as described above. In the first branch the signal is applied to the input of a gate 12 which is opened sequentially by the ante-systole and ante-diastole pulses which are generated at other parts of the circuit at times $t_1$ and $t_2$ (FIG. 6). The trailing edge of the ante-systole and ante-diastole pulses coincide with the systole and the diastole, respectively, so that when the gate 12 closes after each pulse the last signal voltage applied across the gate corresponds with the patient's systolic or diastolic blood pressure. These last signal voltages are stored in the S.D. store 13. FIG. 7 shows the signal output from the gate 12.

Figure 8:
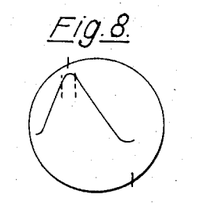
Figure 9:
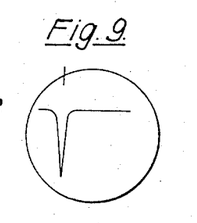
Figure 10:
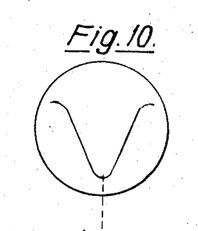
Figure 11:
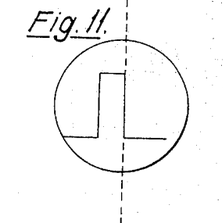
Figure 12:
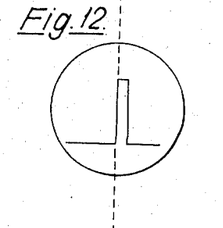
Figure 13:
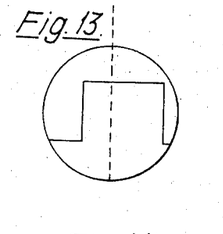
Figure 14:
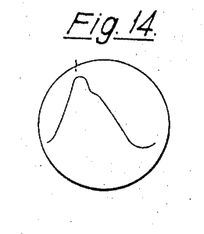
Figure 15:
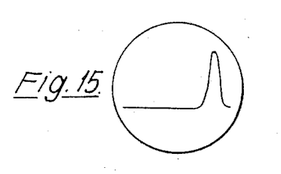
Figure 16:
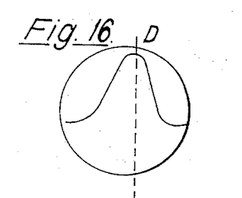
Figure 17:
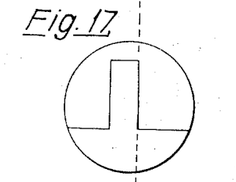

In the second branch the signal (FIG. 8) passes to the systole peak-generator 15 which detects the systole and amplifies and inverts the detected peak (FIG. 9). FIG. 10 shows the detected systole peak trace with the time expanded. The trace is utilised to produce the ante-systole pulse (FIG. 11) at the ante-systole pulse generator 16, which begins at the predetermined time $t$ and ends at the systole as detected by the systole peak-generator 15. The post-systole pulse is generated in the post-systole pulse generator 17 and starts at the detected systole and lasts for a predetermined time. The systole-mono pulse (FIG. 13) is produced in the systole mono generator 18 and begins at time $t_1$, which is the leading edge of the ante-systole pulse and ends at a predetermined time interval after the systole. The systole-mono produces a gated-current in the generator 20 which current is passed to another part of the circuit. The systole-mono is also smoothed in the filter 19 so as to give a reading of the patient's heart rate.

Figure 18:
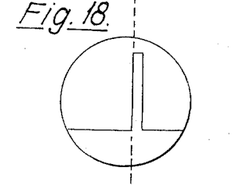
Figure 19:
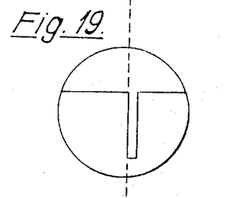
Figure 20:
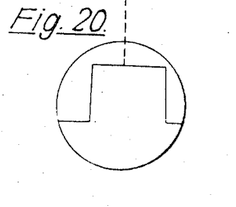

In the third branch, the ante-diastole pulse, the post-diastole pulse, the diastole-mono and the gated-current are produced in similar manner (see FIGS. 14 to 20) to that described above with reference to the ante-systole, post-systole, systole-mono and gated-current with the exception that both positive (FIG. 18) and negative (FIG. 19) post-diastole pulses are produced in the post-diastole pulse generator 24 for use in other parts of the circuit.

Figure 21:
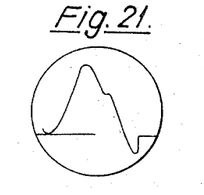
Figure 22:
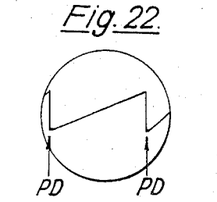
Figure 23:
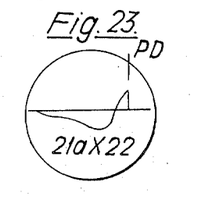

In the fourth branch, the diastole of each wave form is clamped to earth by the positive post-diastole pulse in the D.C. block and clamp 29 while just before clamping the difference $Vf(t) - Vpd$ (FIG. 34) is measured, being the voltage difference between the diastole about to be clamped to earth and the preceding diastole (FIG. 21). Simultaneously, a ramp (FIG. 22) of predetermined inclination is produced by the ramp generator 53 between the leading edges of the adjacent post-diastole pulses. The ramp represents a linearly increasing voltage the value of which $uf(t)$ at the peak of the ramp i.e. immediately before a postdiastole pulse, is a function of the time between adjacent post-diastole pulses. This voltage $uf(t)$ thus represents the base $a,b$ of a triangle $a\,b\,c$ (FIG. 34) and the altitude $b\,c$ is represented by $Vf(t) - Vpd$ already determined. The base and altitude are continuously multiplied together and halved in the multiplier 31, a voltage signal as shown in FIG. 23 being the output from the multiplier; the voltage measured immediately prior to the leading edge of a post-diastole pulse is a measurement of the area of the triangle $a\,b\,c$.

Figure 24:
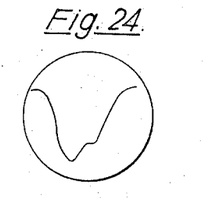
Figure 25:
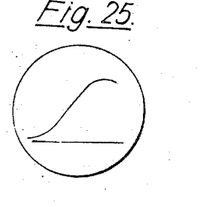

While the area of the triangle $a\,b\,c$ is being measured the smoothed signal is passed to the fifth branch where it is inverted (FIG. 24) then clamped to earth by the negative post-diastole pulse at each diastole. This clamping is carried out in the D.C. block and clamp 34. The signal thus clamped passes to the integrator 35 which integrates each waveform over the base $a\,b$ (FIG. 34) and which is then reset by a post-diastole pulse (FIGS. 31A and C) so as to obtain a measurement (FIG. 25) of the area under the waveform and above the base $a\,b$. This area is the approximate stroke integration which is compensated by adding the area of the triangle $a\,b\,c$ in the adder 32 so as to obtain the area between the waveform and the line joining adjacent diastoles. In the example shown in FIG. 34, the area of the triangle will be made negative so that the correct compensation is obtained. However, in the case of a waveform as shown in FIG. 21 the area of the triangle $a\,b\,c$ will be positive.

Figure 26:
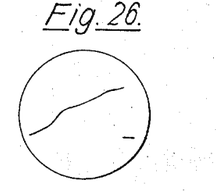
Figure 27:
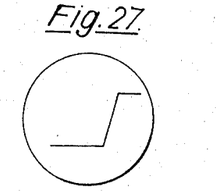
Figure 28:
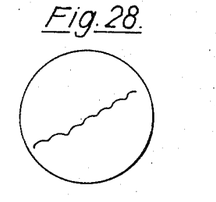

The output signal from the adder 32 (FIG. 26) is measured immediately prior to the leading edge of the post-diastole pulse, by means of the gate 33 (FIG. 27) so as to give a reading of the patient's stroke volume, which reading is stored in the stroke integration store 34. A branch of the output from the adder 32 passes to a stroke integration adder 32' which sums the stroke integration over a period of 30 seconds (FIG. 28) and is reset to zero every 35 seconds by the timing circuit 36, 37, 38 so as to make available a measurement of the patient's cardiac output.

The measurements of cardiac output and stroke volume are compensated by the "K" factor, and are then available, together with the readings of systolic and diastolic pressure, mean blood pressure and heart rate for display on a digital voltmeter 47, each display being selectable by a function selector 39 for a period of 5 seconds and the cardiac output being displayed automatically every 30 seconds for a period of 5 seconds irrespective of what other function has been selected.

Figure 31A:
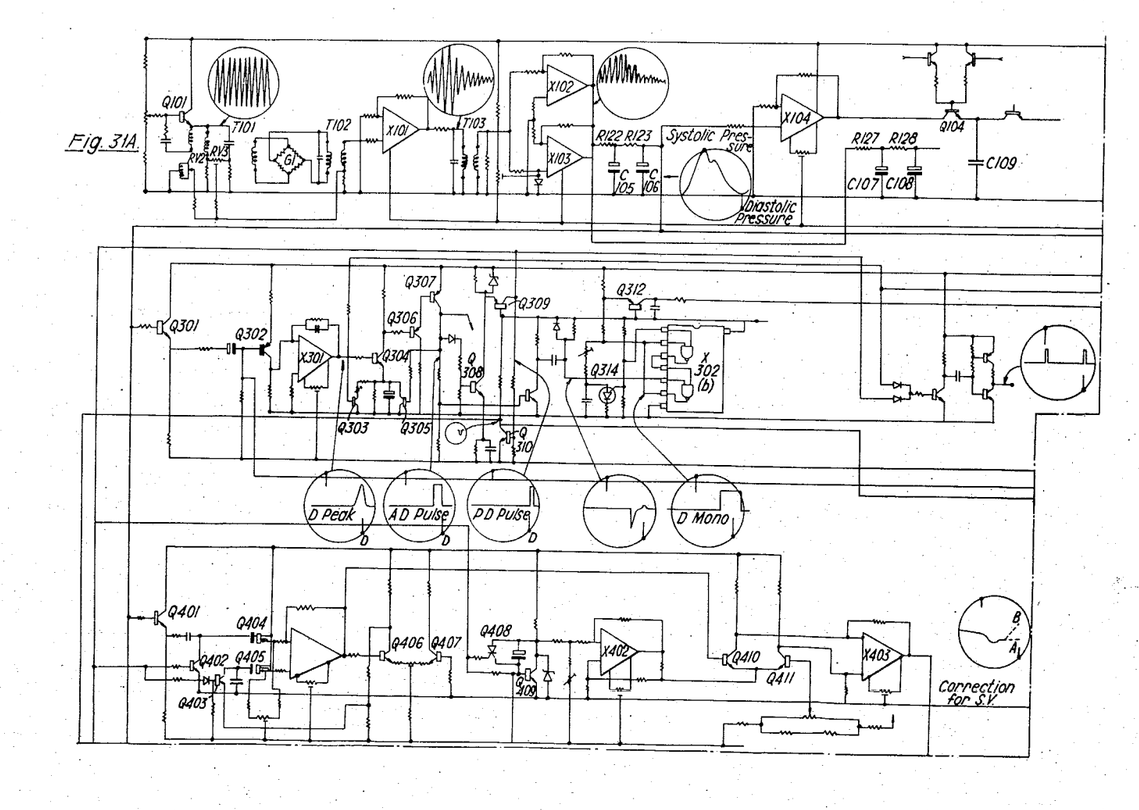
FIGS. 31A, B, C and D together form, when arranged in the manner shown in FIG. 32, a circuit diagram corresponding to FIGS. 29, 30 and 30A and showing as inserts the form of signals generated or existing at specific points in the circuitry.
Figure 31B:
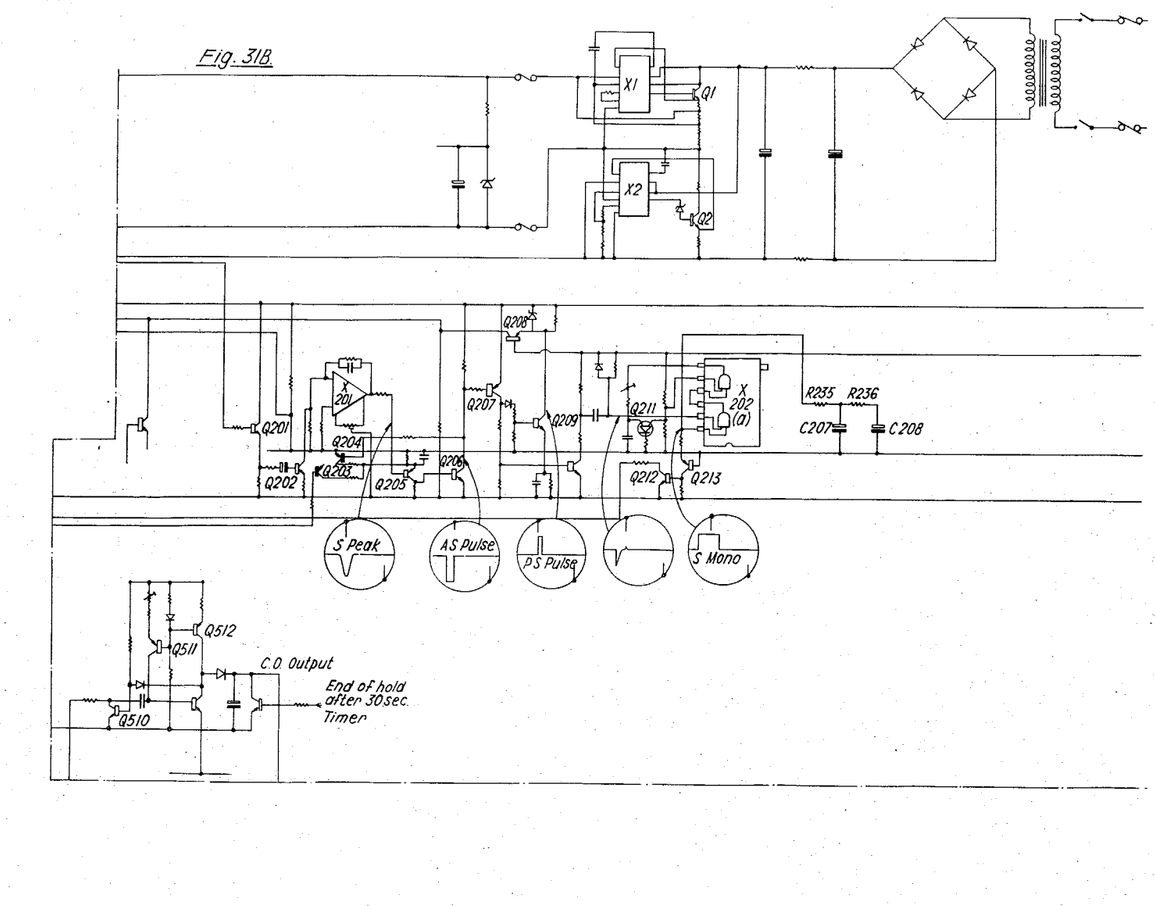
Figure 31C:
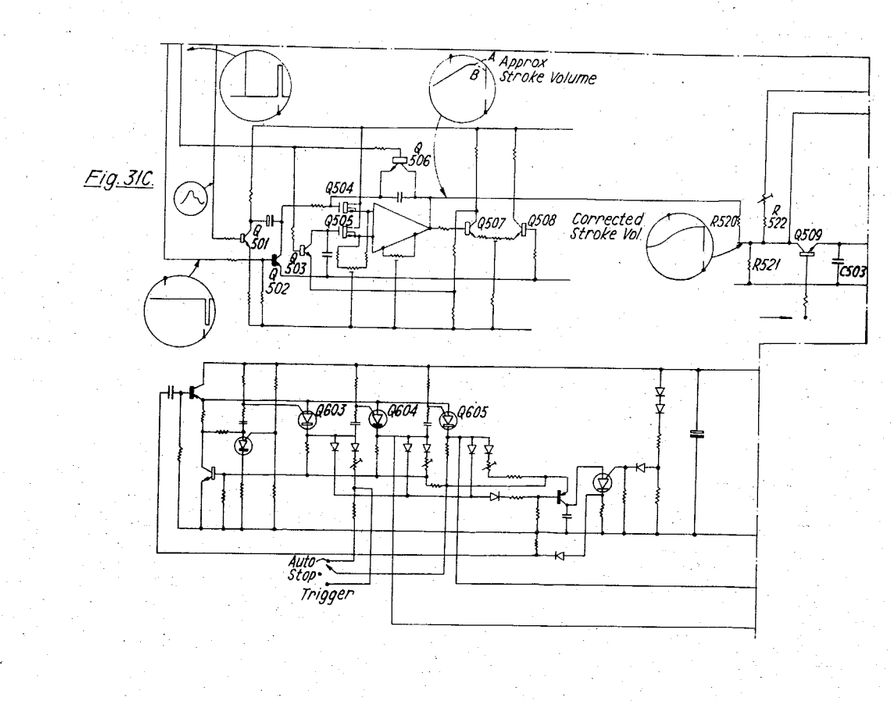
Figures 31D, 32:
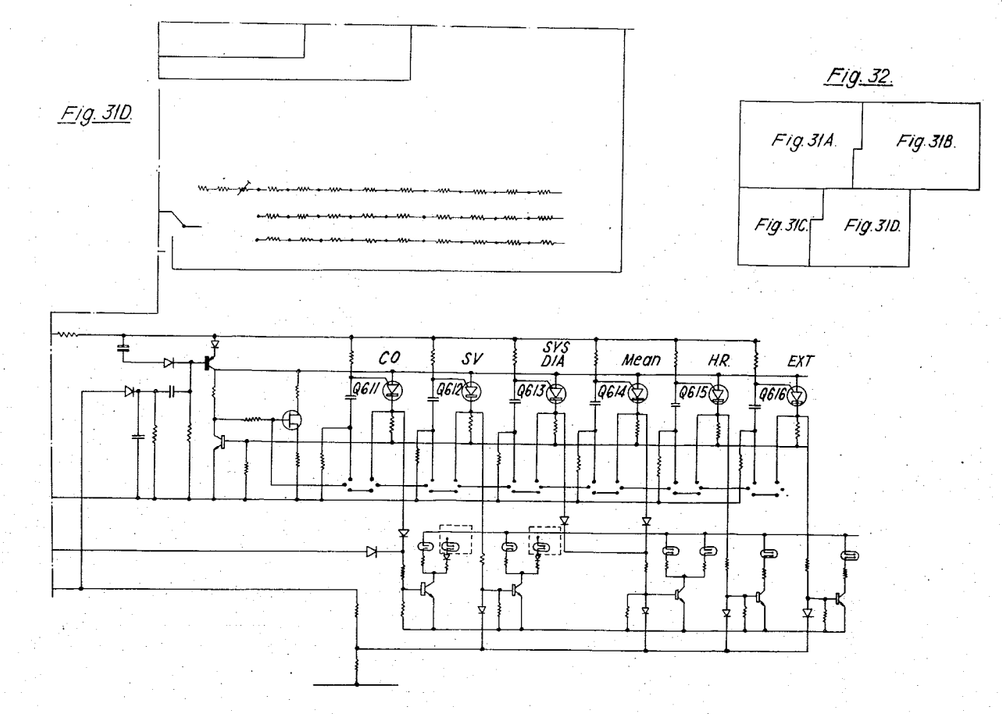

FIGS. 31, A, B, C and D when arranged in the manner of FIG. 32, illustrate a specific circuit diagram of the above-described apparatus and for ease of comparison the individual transistors and the like in FIGS. 31A–D are individually numbered and the elements forming the various blocks of FIG. 29 are denoted thereon. For example, the oscillator 1 of FIG. 29 is shown to include element Q101 of FIGS. 31A–D. In FIG. 31A the oscillator includes transistor Q101 and associated circuitry denoted RV2 and RV3.

What we claim is:

1. Cardiac monitoring apparatus comprising a blood pressure detector for deriving a signal representative of blood pressure at each instant in time and an arrangement for providing a measurement of the area bounded, on a plot of the signal, by the straight line joining adjacent diastoles and the signal curve extending between said diastoles, said arrangement including, first means responsive to said detector for detecting the occurrence of diastoles of the blood-pressure-representative signal and for determining the magnitude of the signal at each diastole relative to a fixed datum, second means responsive to said first means for providing an output representative of the elapsed time between successive occurrences of diastoles, third means responsive to said first means for providing an output representative of the difference in magnitude of the signal at successive diastoles, fourth means for multiplying the outputs from the second and third means and providing an output representative of one half thereof with a polarity dependent upon the output of the third means, an integrator responsive to said detector to integrate said blood-pressure-representative signal with respect to time, said integrator being reset by said first means on the occurrence of each diastole, fifth means for repetitively summing the outputs of said fourth means and said integrator immediately prior to resetting of said integrator, and means for displaying each said summation which is representative of cardiac stroke volume.

2. Apparatus as claimed in claim 1, including sixth means responsive to said detector for detecting the occurrence of systoles of the blood-pressure-representative signal and seventh means responsive to said sixth means for providing an output of predetermined duration and being representative of heart rate.

3. Apparatus as claimed in claim 1, including a further summation means responsive to said fifth means and arrangement to sum over a predetermined time interval consecutive outputs of said fifth means to provide an output which is representative of cardiac output.

4. Cardiac monitoring apparatus comprising a blood pressure detector for deriving a signal representative of blood pressure at each instant in time and an arrangement for providing a measurement of the area bounded, on a plot of the signal, by the straight line joining adjacent diastoles and the signal curve extending between said diastoles, said arrangement including, first means responsive to said detector for detecting the occurrence of diastoles of the blood-pressure-representative signal and for determining the magnitude of the signal at each diastole relative to a fixed datum, second means responsive to said first means for providing an output representative of the elapsed time between successive occurrences of diastoles, third means responsive to said first means for providing an output representative of the difference in magnitude of the signal at successive diastoles, fourth means for multiplying the outputs from the second and third means and providing an output representative of one half thereof with a polarity dependent upon the output of the third means, an integrator responsive to said detector to integrate said blood-pressure-representative signal with respect to time, said integrator being reset by said first means on the occurrence of said diastole, fifth means for repetitively summing the outputs of said fourth means and said integrator immediately prior to resetting of said integrator, to provide an output which is representative of cardiac stroke volume, further summation means responsive to said fifth means and arranged to sum over a predetermined time interval consecutive outputs of said fifth means to provide an output which is representative of cardiac output, sixth means responsive to said detector for detecting the occurrence of systoles of the blood-pressure-representative signal, seventh means responsive to said sixth means for providing an output of predetermined duration and being representative of heart rate, display means including a visual display device and a function selector connected to permit display of a selected one of the outputs from said fifth means, said further summation means, and said seventh means.

5. Apparatus as claimed in claim 4, wherein said display means includes a timer coupled to impose a maximum duration on the display of a selected function.

6. Apparatus as claimed in claim 5, wherein said function selector includes a further timer coupled to cause automatic display of a predetermined function at predetermined intervals of time.

* * * * *